350-172 CROSS REFERENCE SEARCH ROOM

PLURAL CHANNEL OPTICAL MEMORY USING LIGHT BEAM TRANSIT TIME TO DISCRIMINATE AMONG CHANNELS

Filed March 8, 1965

INVENTORS K. D. BOWERS
L. J. VARNERIN, JR.
BY Herbert M. Shapiro
ATTORNEY

United States Patent Office 3,403,261

Patented Sept. 24, 1968

3,403,261

PLURAL CHANNEL OPTICAL MEMORY USING LIGHT BEAM TRANSIT TIME TO DISCRIMINATE AMONG CHANNELS

Klaus D. Bowers, Summit, and Lawrence J. Varnerin, Jr., Watchung, N.J., assignors to Bell Telephone Laboratories, Incorporated, New York, N.Y., a corporation of New York Filed Mar. 8, 1965, Ser. No. 438,021
2 Claims. (Cl. 250—219)

ABSTRACT OF THE DISCLOSURE

A word-organized memory is described where corresponding bits of binary words are stored as the presence and absence of obstructions in corresponding ones of a plurality of memory media. The media are positioned to define different optical distances between a light source and a detector. A digital light deflector addresses selected bits and the detector detects the bits of a selected word as a coded sequence of pulses.

Figures 1, 2:
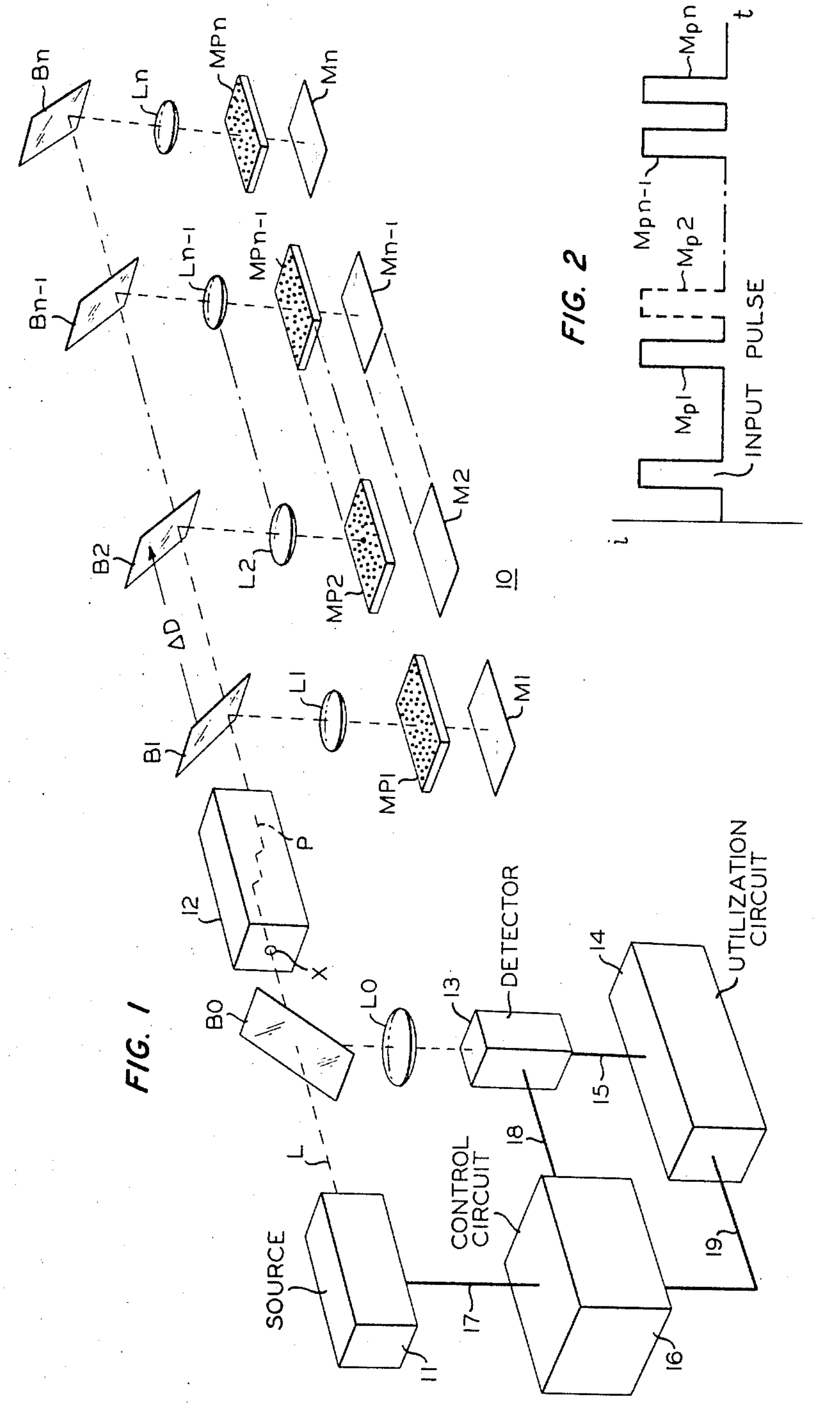

Reflective-type light deflection systems are, in accordance with this invention, provided with multiple channels to increase the accessing capacity thereof and to enable light accessing of word-organized memories.

In this connection, the term "reflective-type" designates a light deflection system wherein a beam of polarized light, typically from an optical maser, is directed through a light deflector along a selected path to a selected output position thereof for addressing, for example, a bit location on a memory medium, but wherein the light after addressing that bit location is reflected, typically by a mirror, back along what is essentially a mirror image of its forward transmission path before being detected. The term "multiple channel arrangement" designates that portion of a light deflection system wherein light in a selected output position of the light deflector therein is routed along a plurality of corresponding paths by a plurality of lenses for addressing, illustratively, the corresponding bit locations on each of a plurality of memory media. A multiple channel arrangement in a nonreflective light deflection system is described in Large-Capacity Memory Techniques for Computing Systems, edited by M. C. Yovits, p. 79, an article entitled "The Flying Spot Store," by C. W. Hoover, Jr., and G. Hougk. Reflective-type light deflection systems and various uses therefor are disclosed in copending application Ser. No. 420,976, filed Dec. 24, 1964, for J. T. Sibilia and W. J. Tabor, now abandoned. That application discloses a reflective-type light deflection system wherein light is displaced by angular deflection.

The above-mentioned article teaches that the advantages of a multiple channel arrangement depend on the ability thereof to address, simultaneously, one bit location in each memory medium employed. This is to be contrasted with the addressing of only one bit location with each output beam from the light deflector in a deflection system not including a multiple channel arrangement. The former not only permits the addressing of a larger number of bit locations but also permits word organization. The latter is not only limited to the addressing of a lesser number of bit locations but also is limited to bit organization. The article further teaches that the advantages of a multiple channel arrangement are realized by placing a detector next adjacent each memory medium for providing parallel readout.

In accordance with this prior art teaching, one would expect the multiple channel arrangement to be incompatible with reflective-type deflection systems. The reason for this is that a typical reflective-type light deflection system includes a mirror positioned adjacent the addressed memory for reflecting the addressing light beam back through that memory, back through the light deflector to a suitably positioned detector. If a plurality of lenses are employed to divide the addressing light beam into a plurality of light beams for addressing the corresponding bit locations on a plurality of memory media, mirrors adjacent these media merely reflect the light to reconstitute the single beam at the output of the light deflector and the detector detects only one output pulse. The advantages of multiple channels are lost.

It is an object of this invention to provide a new and novel light deflection system having a relatively high addressing capacity.

Another object of this invention is to provide a reflective-type light deflection system for addressing word-organized memories.

The above and further objects of this invention are realized in one embodiment thereof wherein a plurality of memory media are positioned different optical distances from a source of polarized light in a reflective-type light deflection system. In this manner, light routed, via multiple channels, from the selected output position of the light deflector to the corresponding bit location on each of the plurality of memory media requires a characteristic transit time for each memory medium. The light input to the deflection system is a short pulse of polarized light after which the detection circuit receives a sequence of pulses, or absence of pulses, corresponding to the accessed bit locations, at times thereafter depending on the characteristic transit times.

Accordingly, a feature of this invention is a light deflection system wherein a multiple channel arrangement divides a light beam in a selected output position of a light deflector into a plurality of light beams each directed at the corresponding bit location on each of a plurality of memory media which are spaced prescribed different distances from the source of that beam of light.

A further feature of this invention is a light deflection system wherein a beam of light in a selected output position of a light deflector, directed by a multiple channel arrangement at corresponding bit locations on memory media spaced prescribed different distances from the source of that beam, is reflected by mirrors adjacent those media to provide in a remote detector a sequence of pulses at times determined by those prescribed different distances.

The invention is disclosed, illustratively, in terms of light deflection, visible light being contemplated. The invention, however, is not limited to visible light and the use thereof with any electromagnetic wave energy is contemplated.

The foregoing and further objects and features of this invention will be understood more fully from a consideration of the following detailed description rendered in conjunction with the accompanying drawing, wherein:

FIG. 1 is a schematic arrangement of an illustrative reflective-type multiple channel light deflection system in accordance with this invention; and FIG. 2 is an illustrative sequence of output pulses produced during the operation of the system of FIG. 1 in accordance with this invention.

FIG. 1 shows a reflective-type light deflection system 10 including a multiple channel arrangement in accordance with this invention. The system includes a source 11 of a beam L of plane polarized light. Beam L is directed through beam splitter B0 into an aperture X in a light deflector 12 along a path therein, designated P, in a well known manner. Beam L emerges from the deflector in a selected output position and passes through a succession of spaced apart beam splitters B1, B2 . . . B$n$—1. In this connection, a beam splitter is typically a partially silvered mirror which permits transmission of a portion of a light beam incident thereto and reflects the remaining portion of that beam. Beam splitters are well known. Each beam splitter has associated therewith a lens, designated L1 . . . L$n$—1, a memory plane, designated MP1 . . . MP$n$—1, and fully reflective mirrors designated M1 . . . M$n$—1. Each beam splitter B1 . . . B$n$—1 along with the associated like designated elements constitutes a channel. An $n$th channel includes a fully reflective mirror, designated B$n$, rather than a beam splitter. The $n$th channel includes additional elements L$n$, MP$n$, and M$n$, as in the other channels. A photodetector 13 is positioned adjacent beam splitter B0 separated therefrom by a focusing lens L0. A utilization circuit 14 is connected to detector 13 via a conductor 15. Source 11, detector 13, and utilization circuit 14 are connected to a control circuit 16 by conductors 17, 18 and 19, respectively.

For a full understanding of an illustrative operation to be described hereinafter, a brief recapitulation may well be undertaken at this point in terms of the structure just described. Specifically, the forward transmission path of light from source 11 to the output of the light deflector 12 is singular, uniquely determined (along path P) by the light deflector as is well known. More specifically, the light deflector includes a plurality of stages each of which includes an element for rotating the plane of polarization of polarized light if a voltage is impressed across it and, typically, a birefringent element for transmitting light along a path determined by the orientation of the plane of polarization. The path of the light is determined then by the voltage code applied to the various stages of the deflector. From the output of the light deflector the light is divided into a plurality of paths, that is to say, along paths through the first, second, . . ., $n$—1th, and $n$th channels, each requiring a different transit time characteristic of that path. Such a division of the light is analogous to fanout in electrical or magnetic parlance and is commonly termed "paralleling" in connection with light. The terms "multiple channels" and "multiple channel arrangements" are used herein as more descriptive terms.

Whatever the designation, importantly, light from the selected output position of the deflector is routed through a plurality of paths to corresponding bit locations on the memory media therein to individual mirrors which reflect light back along that plurality of paths to the selected output position of the light deflector. Each of the plurality of paths includes what is described herinbefore as a channel; the terms "plurality of paths" and "multiple channels" may be used interchangeably without ambiguity. Although these channels are of like construction, they are disposed in spaced apart relationship such that light directed from the selected output position of the light deflector along a path through a selected channel requires a prescribed time to reach the reflecting mirror in that channel. Upon reflection by the corresponding mirror, the light requires the same prescribed time to retraverse the path to the selected output position of the light deflector. Due to the different path lengths introduced by the spaced apart position of the various channels, this prescribed time is different for each channel (path). Accordingly, the time required for light to traverse and retraverse the path from the output of a light deflector, along a prescribed path to a mirror and back, designated the "transit time" herein, is seen to be unique and characteristic of the channel (path) selected. The term "transit time" may also represent the entire traversal time from source to detector herein because light, except for traversing the different distances in the multiple channels as described, does otherwise traverse a single path of prescribed distance.

In the described illustrative system, corresponding positions on the various memory media (planes) MP1, MP2 . . ., MP$n$—1, and MP$n$ correspond to bit locations of a binary word. Upon reflection of light from the mirrors in the individual channels, light, rather than being reflected to reconstitute a single light pulse, is reflected to provide individual pulses of light which arrive back at the selected output position of the light deflector at different times characteristic for the corresponding channels traversed. Since, from the output of the deflector to the detector, a like distance is traversed by the light in each channel, light therefore registers in the detector herein as a sequence of pulses at corresponding characteristic times after an input pulse.

For illustrative purposes, the memory planes described herein are photographic films in which an opaque spot, developed by well known means, represents a first binary value. The absence of such a spot represents a second binary value. Assume that the absence of an opaque spot in a selected bit location corresponds to a binary "1," and the presence of a spot corresponds to a "0." Then, the operation of a light deflection system in accordance with this invention may now be illustrated for the reading of a binary word 10 . . . 11 stored in the corresponding bit locations of memory planes MP1, MP2 . . . MP$n$—1, and MP$n$, respectively. To this end, the addressed (accessed) locations of the memory planes MP1 . . . MP$n$—1, and MP$n$ have no opaque spots thereon; the addressed bit location of memory plane MP2 has an opaque spot.

A light pulse is applied by source 11 under the control of control circuit 16. A portion of the light beam passes beam splitter B0 through aperture X in light deflector 12, along path P therein, to a selected output position. The beam in the particular output position passes successively through beam splitters B1, B2 . . . B$n$—1 at each of which a portion of the beam is reflected through lenses L1, L2 . . . L$n$—1 to the corresponding bit location of memory planes MP1, MP2 . . . MP$n$—1. In this connection, the beam splitters have successively greater reflectivity to insure an equal distribution of light in the several channels. Alternatively, an arrangement of mirrors may be provided in a straightforward manner for achieving the equal distribution of light with beam splitters of like reflectivity. The light passed by beam splitter B$n$—1 passes therethrough and is reflected by mirror B$n$ through lens L$n$ to the corresponding bit location on memory plane MP$n$. Lenses L1, L2 . . . L$n$—1 and L$n$ are employed merely for focusing the beams on the selected bit locations in a well known manner.

Because memory planes MP1, MP$n$—1, and MP$n$ have no opaque spots in the selected bit locations in accordance with the assumed illustrative operation, light passes therethrough to be reflected by mirrors M1 . . . M$n$—1, and M$n$, respectively. Memory plane MP2, assumed to have an opaque spot in the selected location, permits only negligibly little light to pass therethrough for reflection by mirror M2.

Light reflected from mirrors M1 . . . M$n$—1, and M$n$ passes through the corresponding bit locations back through focusing lenses L1 . . . L$n$—1, and L$n$ to beam splitters B1 . . . and B$n$—1, and mirror B$n$, respectively. Because of the spatial arrangement of the different channels, however, light therein requires different transit times as is mentioned hereinbefore and is further explained in detail hereinafter. The light in the first channel is the first to return to deflector 12 to retraverse path P. This light is partially deflected by beam splitter B0 through lens L0 to photodetector 13 to utilization circuit 14 under the control of control circuit 16. No light is returned from the second channel because of the presence of an opaque spot in the selected bit location in the memory plane there. Light in the $n$—1th channel and the $n$th channel later retraverses path P in their characteristic transit time to register via detector 13 the absence of opaque spots in the selected bit locations of memory planes MP$n$—1 and MP$n$. Thus, in response to an input pulse of polarized light the presence or absence of opaque spots in selected bit locations of addressed memory planes is registered. The resulting pulses are summarized in FIG. 2 by the pulse forms designated M$p$1, M$pn$—1, and M$pn$. The absence of light in the second channel and, consequently, the absence of a pulse in the corresponding time slot are indicated in FIG. 2 by the broken pulse form designated M$p$. The pulse forms are shown, illustratively, with respect to a time abscissa and a current ordinate. For this purpose, detector 13 may be any fast light detector capable of operation in accordance with this invention. In this connection, source 11, utilization circuit 14, and control circuit 16 may be any source and circuits capable of operation in accordance with this invention. The control circuit may include an AND circuit for permitting detection by the detector only when a light pulse is incident thereon in coincidence with an applied timing pulse providing time slots for the detection of pulses and apparatus for initiating an input beam and a sequence of timing pulses.

Thus, the illustrative memory operates as a semipermanent read only, word-organized memory, the memory media being prepared by other means well known. As is mentioned in the aforementioned copending application, an undeveloped photographic film may be used as the memory plane and information stored thereon by selective exposure thereof by the light beam L. In this instance, however, shutter means are required to prevent like information from being stored in all locations of a selected word.

The incompatibility between reflective-type light deflection systems and multiple channel arrangements is seen resolved hereby by arranging the multiple channels such that light traverses different distances for addressing the corresponding bit location in each of the memory media therein. As may be seen in FIG. 1, input light traverses a common distance from the source to the output of deflector 12. On the return trip, that input light traverses a common distance from the output to detector 13. Between the output of deflector 12 and the mirrors M1, M2 . . . M$n$—1, and M$n$ light traverses different distances. In the illustrative arrangement, the distances between the elements B, L, MP, and M in each channel are shown to be the same. Accordingly, the different distance traversed by the light in each successive channel is introduced by spacing apart the beam splitters B1, B2 . . . B$n$—1, and mirror B$n$ as stated hereinbefore. Since reflective-type light deflection systems are contemplated, the distance between successive beam splitters is traversed twice. Taking the velocity of light as $3\times10^{10}$ centimeters per second a distance ΔD, between successive beam splitters and between beam splitter B$n$—1 and mirror B$n$ of about 3.0 centimeters introduces differences of about 0.2 nanosecond in the transit time of light in successive channels. In this connection, a suitable detector for detecting nanosecond separations between light pulses is disclosed in copending application Ser. No. 214,302, filed Aug. 2, 1962 for N. C. Wittwer, Jr., now Patent 3,215,844 issued November 2, 1965. Greater or smaller pulse separations are provided, of course, by making the distance between successive beam splitters (and mirror B$n$) shorter or longer, respectively.

Advantageously, the input pulses are short, typically less than the difference between detected pulses. In this manner, detection of the pulses is simplified. For a typical light deflection system having an equivalent optical length of about 33.0 centimeters (including 2.0 centimeters from source to aperture X, 2.0 centimeters from aperture X to detector 13, 2.0 centimeters from the deflector output to the first beam splitter, and 3.0 centimeters from each beam splitter to the corresponding mirror), a 0.1 nanosecond input light pulse produces a sequence of output pulses (and absence of pulses) where the first pulse is detected typically after 2.2 nanoseconds, the second in 2.4 nanoseconds, the $n$—1th in $2+0.2(n-1)$ nanoseconds, and the $n$th in $2+0.2n$ nanoseconds after the input pulse. For a ΔD of 3.0 centimeters, and in accordance with the assumed illustrative word 10 . . . 11, current pulses are provided in photodetector 13 as shown in FIG. 2. The pulse corresponding to the first channel appears 2.2 nanoseconds after the input pulse, the pulse corresponding to the second channel is absent, and those corresponding to the $n$—1th and $n$th channels appear 0.2 ($n$—2) nanosecond and 0.2 ($n$—1) nanosecond, respectively, after the input pulse. The duration of the output pulse is the same as that of the input pulse. It may be appreciated that an input pulse of a duration longer than the spacing between output pulses complicates detection because the pulses from the several channels then overlap each other. Accessing time also increases as the duration of the input pulses increase. Any well known pulsed optical maser provides input pulses of a type suitable in accordance with this invention.

The invention has been disclosed in terms of multiple channels wherein different light transit times therein, in accordance with this invention, are provided by spacing apart the beam splitters (and mirror B$n$). Such different transit times may be provided by other means however. For example, the various memory "media" may be defined in a single photographic film, as shown in the aforementioned article. In this instance, the different transit times may be provided by spacing mirrors, corresponding to mirrors M1, M2 . . . M$n$—1, and M$n$ of FIG. 1, different distances from their corresponding memory planes.

Any limitation in the number of bit locations on a photographic film accessed in accordance with this invention also applies to an arrangement where a plurality of memory media are defined on a single photographic film. Therefore, if say $10^6$ bit locations may be accessed on a single film, the plurality of media defined thereon may collectively include only this number of bits. The system of FIG. 1 is not so limited; each memory media in embodiments of the type shown therein may have the full complement (106) of bit locations.

Moreover, the use of the presence and absence of reflecting rather than opaque spots on a memory medium permits operation, in accordance with this invention, in the absence of reflecting mirrors.

What have been described here are considered to be only illustrative embodiments according to the principles of this invention, and it is to be understood that numerous other arrangements may be devised by one skilled in the art without departing from the spirit and scope thereof.

What is claimed is:

1. A word-organized memory comprising a source of a pulsed input beam of plane polarized light, a multistage digital light deflector wherein the path of light transmitted through said deflector is determined responsive to the coded presence and absence of voltages across the various stages therein, each of said stages comprising means for selectively rotating the plane of polarization of said input beam and birefringent means for transmitting said input beam along different paths dependent upon the plane of polarization, said deflector having input and output ends and being arranged in the optical path of said input beam, means dividing the beam at said output end into a plurality of spaced apart secondary beams, a plurality of memory media each positioned in the path of a different one of said secondary beams and including the presence and absence of obstructions to light thereon defining one bit of each memory word, said media being positioned different optical distances from said output end thus determining different optical transit times, said input beam having a duration shorter than the shortest of said transit times, a mirror positioned in the optical path adjacent each of said media to retroflect into said output end of said deflector at the same position at which the beam exited the secondary beam passed by the associated memory medium while the voltage code is maintained, means separating said secondary beams from said input beam, and a detector for detecting a sequence of light output pulses for each input beam.

2. A memory in accordance with claim 1 wherein said means routing said light comprises a plurality of spaced apart beam splitters.

References Cited

UNITED STATES PATENTS

Re. 26,170 3/1967 Harris.

DAVID SCHONBERG, *Primary Examiner.*

R. J. STERN, *Assistant Examiner.*